Patented June 17, 1947

2,422,259

UNITED STATES PATENT OFFICE 2,422,259

DRYING OIL-POLYVINYL ACETAL COMPOSITIONS

Burt Carlton Pratt, Wilmington, Del., assignor to E. I. du Pont de Nemours & Company, Wilmington, Del., a corporation of Delaware No Drawing. Application October 15, 1943, Serial No. 506,427

1 Claim. (Cl. 260—23)

This invention relates to new compositions of matter and more particularly to resinous and film-forming materials derived from certain vegetable oils and polyvinyl acetals or polyvinyl ketals.

Although polyvinyl acetals or ketals are compatible with those oils in which the polyhydric alcohol monobasic acid ester composing the oil contains hydrozyl groups, these acetals and ketals being compatible, for example, with blown drying oils obtained by heating them while passing air therethrough which introduces hydroxyl groups into the molecule, it has not been possible previously to prepare homogeneous compositions from mixtures of polyvinyl acetals or ketals with oils consisting essentially of polyhydric alcohol esters of non-hydroxylated oils because of the incompatibility of these substances.

This invention has as an object the production of new and useful compositions of matter comprising blends of polyvinyl acetals or polyvinyl ketals with the polyhydric alcohol non-hydroxylated monobasic carboxylic acid esters. A further object is the manufacture of compatible mixtures of polyvinyl acetals or ketals with vegetable oils with which these acetals and ketals are normally incompatible. Further objects reside in methods for obtaining these compositions. Other objects will appear hereinafter.

The above objects are accomplished by a method in which a polyhydric alcohol ester of a non-hydroxylated monobasic carboxylic acid of at least 6 carbon atoms in which all the hydroxyls of the alcohol are essentially completely esterified with the acid, is heated as described hereinafter with a polyvinyl acetal or a polyvinyl ketal until a product compatible at ordinary temperatures is obtained.

The polyhydric alcohol ester must consist substantially or essentially of the monobasic carboxylic acid ester since polyhydric alcohol esters of dicarboxylic acids cannot be made compatible with the polyvinyl acetals or ketals by the present process. For this reason bodied oils are not used in the practice of this invention since the long heat treatment at high temperature to which the drying oils are subjected to body them results in the formation of polyhydric alcohol esters of dicarboxylic acids.

The time of heating the acetal or ketal with the non-hydroxylated polyhydric alcohol monobasic carboxylic acid ester previously referred to will vary with the temperature and is generally from ½ to 6 hours, but in all cases the heating will be continued until a mixture is compatible at ordinary or room temperature. In most cases the heating is from 250° to 300° C. which attains compatibility in a convenient length of time. Temperatures as high as 300° C., however, can be readily used, and the upper limit of temperature is determined by the decomposition point of the reactants and reaction products.

In a preferred method for practicing the invention a quantity of powdered polyvinyl acetal is added to a drying oil heated to 225° C., and the originally incompatible mixture is heated to 275°–280° C. with vigorous stirring and held at that temperature until the components are compatible at ordinary temperatures. The amount of polyvinyl acetal added depends upon the use to which the product is to be put. In the preparation of flexible coating compositions such as are needed for fabric coatings about 25 parts of polyvinyl acetal is added to 75 parts of oil. For the preparation of hard coating compositions such as are applied to rigid substrates or for the preparation of products which can be used as plastics, about 75 parts of polyvinyl acetal is added to 25 parts of oil. Examples I and III below illustrate the use of small and large amounts of polyvinyl acetal respectively. For many applications it is found advantageous to use ratios somewhere between these extremes.

In the following examples parts are by weight.

Example 1

Three hundred and seventy parts of alkali refined linseed oil is heated in a varnish kettle to 225° C. To this is added with stirring over a period of forty-five minutes 120 parts of low hydroxyl (10–13% hydroxyl calculated as polyvinyl alcohol) polyvinyl acetal prepared from polyvinyl alcohol and n-butyraldehyde. The mixture is heated at 225°–230° C. for one hour and then at 275°–280° C. for about two hours until a cold pill on glass is clear and homogeneous and exudes no oil. The solution is cooled to 140° C. and is thinned with 360 parts xylene. It is then filtered through felt while hot. The viscosity of this solution is found to be T (Gardner-Holdt scale) and its color to be 7.0 (Gardner-Holdt scale).

The application of the above product as a coating composition and the advantages of this composition are illustrated by the following:

To 10 parts of the composition prepared as above is added 0.1% cobalt drier based on oil content (added as a solution of cobalt naphthenate in mineral spirits) and 2 parts of xylene. A film flowed out from this solution and baked one hour at 115° C. is almost tack-free and moderately hard. A film prepared in the same way from unmodified linseed oil (containing the same amount of drier) is very soft and tacky. At room temperature a film from the modified oil becomes dust-free in 1½ hours and after overnight is moderately hard and nearly tack-free. A film from unmodified linseed oil with drier becomes dust-free in 5 hours at room temperature and after overnight is soft and tacky. Likewise film prepared from mixtures of alkali refined linseed oil and polyvinyl butyral which have not been heated are incompatible. The outdoor durability of the oil/polyvinyl acetal combination described above is about equal to that of a high grade commercial spar varnish.

*Example II*

Three hundred and sixty parts of soya oil is heated to 225° C. in a varnish kettle. To this is added with stirring over a period of fifteen minutes 120 parts of powdered polyvinyl formal (obtained from polyvinyl alcohol and formaldehyde). The mixture is then heated at 275°–280° C. for about 1½ hours, until a cold pill on glass is clear and exudes no oil. The solution is allowed to cool to 140° C. and is then thinned with 160 parts of xylene and filtered through felt while hot. The product is now ready for use as a coating or impregnating composition. A film from the above composition containing 0.1% cobalt drier (based on the oil content) baked at 115° C. for one hour is very pliable, although somewhat tacky. A film prepared in the same way from the original soya oil dries very slowly and remains very tacky.

*Example III*

One hundred and twenty parts of alkali refined linseed oil is heated in a varnish kettle to 225° C. To this is added with stirring, during a period of forty-five minutes, 370 parts of a high viscosity (65–85 poises in a 10% ethyl alcohol solution) high hydroxyl (18–20% hydroxyl content calculated as polyvinyl alcohol) polyvinyl acetal prepared from polyvinyl alcohol and n-butyraldehyde. The initially incompatible mixture is heated with stirring to 275°–280° C. for about 45 minutes until a cold pill on glass is clear and exudes no oil. When cooled to 25° C. the product is a light brown solid which is fairly rigid and very tough.

For use in coating compositions, three hundred and forty parts of the material obtained in accordance with the above method is dissolved in a warm mixture of 790 parts of toluene and 80 parts of ethyl alcohol and filtered through felt while hot. To the resulting solution there is added 0.1% cobalt drier (based on the oil content) and the product is brushed out for drying tests. After baking at 115° C. for one hour the film is very hard, tack-free, tough and flexible. A film prepared from a solution of polyvinyl acetal is quite stiff and brittle. A film of the treated oil which is allowed to dry at room temperature becomes tack-free in 15 minutes and after overnight drying is very hard and tough. The films from the compatibilized composition show good outdoor durability. Their resistance to water and alkali are excellent. Coating compositions prepared as described above have excellent stability and may be stored for long periods of time without change.

*Example IV*

Two hundred parts of coconut oil is heated in a varnish kettle to 225° C. To this is added, with stirring, two hundred parts of a powdered polyvinyl ketal prepared from polyvinyl alcohol by heating with 2,2-diethoxy butane in the presence of sulfuric acid catalyst and anhydrous methanol solvent. The originally incompatible mixture is heated with stirring at 280° C. for about 30 minutes until a cold pill on glass is clear and exudes no oil. The product is permitted to cool to 140° C. and is thinned with two hundred parts of xylene and filtered through felt while hot. A film flowed from a solution of the product becomes nearly tack-free in one hour and after overnight drying is glossy and flexible.

The proportions of oil and polyvinyl acetal or polyvinyl ketal will depend on the oil being treated and on the effects desired. The optimum amounts are easily determined for each oil and for each acetal (or ketal), keeping in mind the use to which the final product is to be put. The amount of acetal (or ketal) is usually between 20% and 80% of the total weight of the ester and acetal or ketal. The percentages in special cases can be considerably higher or lower but in any instance at least 5% of one of the components must be present in order that the composition differ substantially in properties from one of the components alone. A preferred embodiment of the invention consists in heating at 225° to 300° C. a drying oil free from self-polymerization products with polyvinyl butyral resin in amount of 20% to 80% based on the total weight of both components. The most valuable products are those obtained by heating at 275° to 280° C. raw linseed oil or alkali refined linseed oil with 25% to 75% on the total weight basis of low-viscosity, low-hydroxyl polyvinyl butyral, e. g., polyvinyl butyral having a viscosity not greater than 30 poises in 10% solution in ethyl alcohol and a hydroxyl content of not greater than 13% calculated as polyvinyl alcohol.

As has been previously indicated the esters used in the practice of this invention are any polyhydric alcohol ester of a non-hydroxylated monobasic acid in which the hydroxyl groups of the polyhydric alcohol are essentially completely esterified with the acid. These acids can contain as many as 30 carbon atoms. Examples of suitable acids include aliphatic, cycloaliphatic, aromatic, carboxylic acids. These can be saturated or unsaturated. The preferred acids are the long chain aliphatic acids containing from 12 to 18 carbon atoms and particularly the acids falling within these limits derived from the non-hydroxylated natural oils. As examples of acids useful for the present purpose the following are mentioned: Caproic, caprylic, capric, lauric, myristic, palmitic, stearic, melissic, beta-furyl acrylic, sorbic, undecylenic, oleic, elaidic, linoleic, linolenic, nonadecanoic, behenic, cyclohexane carboxylic, benzoic, abietic and naphthenic, and the mixed acids derived from unmodified non-hydroxylated oils such as linseed, China wood, soya bean, sunflower, perilla, oiticica, olive palm, seal, and lard oils.

The polyhydric alcohol constituent of the esters of the above mentioned acids also comprise a large number of available materials, for example, ethylene glycol, glycerol, diethylene glycol, polyethylene glycol, pentaerylthritol, mannitol, sorbitol, octamethylene glycol, decamethylene glycol, etc. Of these alcohols glycerol is preferred.

The esters most advantageously used in the practice of this invention are the triglycerides of non-hydroxylated natural oil acids which are ubstantially free from self-polymerization products. Among these triglycerides are linseed, China wood, soya bean, sunflower, perilla, oiticica, olive, palm, seal, and lard oils which have not been heat treated or subjected to other action which causes the formation of self-polymerization products.

The polyvinyl acetals and ketals used in this invention are condensation products of polyvinyl alcohol and aldehydes or ketones prepared in accordance with known methods. The majority of the polyvinyl acetals and polyvinyl ketals which can be used are formed by the condensation of a hydrolyzed polyvinyl ester, for example, hydrolyzed polyvinyl acetate, with a compound of the formula

in which R and R' are hydrogen or hydrocarbon radicals. R and R' may be joined to form a ring. The radicals R and R' can also be substituted with groups which do not interfere with the condensation reaction. Polyvinyl acetals and polyvinyl ketals of lower aldehydes and ketones, that is, those aldehydes and ketones containing less than 5 carbons are preferred because of their availability.

In addition to the polyvinyl acetals and ketals mentioned in the examples, many others can be used including polyvinyl acetals prepared by condensation of polyvinyl alcohol and acetaldehyde, propionaldehyde, heptaldehyde, citral, benzaldehyde, salicylaldehyde, para-nitrobenzaldehyde, cinnamaldehyde, para-chlorobenzaldehyde, anisaldehyde, and furfural, polyvinyl ketals prepared from polyvinyl alcohol and acetone, mesityl oxide, phorone, cyclohexanone, acetophenone, paranitro acetophenone, para-chloroacetophenone, benzophenone, benzalacetophenone, pulegone and methyl-2-thienyl ketone. In addition to polyvinyl alcohol, partially hydrolyzed polyvinyl esters may be used to prepare the acetals and ketals. A mixed acetal (or ketal) prepared from two or more aldehydes (or ketones) may be used. Mixtures of different polyvinyl acetals (and/or ketals) can be used. The invention includes polyvinyl acetals and ketals having both low and high hydroxyl content, e. g., from 0 to 30% of the alcoholic hydroxyls (calculated as polyvinyl alcohol) remaining after reaction, and their viscosity and molecular weight may also cover a wide range.

The products of this invention can be used with added materials such as pigments, synthetic resins, natural resins, plasticizers, driers, fillers, waxes, oxidation inhibitors, catalysts, solvents and the like.

Synthetic resins that are desirably blended with the products of this invention are alkyd resins, particularly the oil-modified resins of this kind, nitrocellulose, organic cellulose esters such as cellulose acetate, cellulose ethers such as ethyl cellulose, polyacrylates and polymethacrylates, polystyrene, polyvinyl esters such as polyvinyl acetate, polyvinyl chloride, polyvinyl alcohol, urea-formaldehyde resins, amide-formaldehyde resins, ester gum, hydrogenated phenol-formaldehyde resins, hydrogenated rosin, limed rosin or leaded rosin, and phenolic modified rosin or ester gum. Examples of suitable natural resins include rosin, copal, kauri, congo, manilla, damar and shellac.

While products of the present invention ordinarily do not require plasticization, in some cases they may be benefited by the use of plasticizers such as normally liquid or low melting triglyceride oils, ester such as dicapryl phthalate or dibutyl sebacate, alkyd resins, and mineral oils. The best driers for use in these compositions are those of known siccative power such as cobalt, manganese, lead, and iron naphthenates. Examples of fillers include wood flour, ground cork and mineral fillers such as mica, whiting and aluminum powders. In certain compositions it is found advantageous to incorporate waxes such as carnauba wax, beeswax, parafin wax, spermaceti wax, hydroxystearic and montan wax. When the oil composition is particularly fast drying it is sometimes advisable to add anti-skinning, anti-settling or anti-gelling agents. Such inhibitors include pine oil, hydroquinone, guaiacol, cresol, ortho-phenyl phenol, butyraldehyde oxime, and soya lecithin. Examples of solvents which may be used in these compositions are aliphatic or aromatic hydrocarbons, esters, ketones, ethers, chlorinated hydrocarbons and nitroparaffins.

The products of this invention are especially useful in formulating improved air-drying or baking coating composition and can be used to coat metal or wood, directly or over a suitable base coat, and can also be used over glass, leather, stone, cloth, paper, rubber, or cellulose. Certain of these compositions are useful as impregnating or adhesive compositions, plasticizers, binders for floor or wall coverings, and molding compositions.

As many apparently widely different embodiments of this invention may be made without departing from the spirit and scope thereof, it is to be understood that I do not limit myself to the specific embodiments thereof except as defined in the appended claim.

I claim:

A process which comprises heating at 275° to 280° C. a mixture consisting of alkali refined linseed oil and low-viscosity, low-hydroxyl polyvinyl butyral in amount of from 25% to 75% of said mixture, and continuing the heating until the mixture is compatible at ordinary temperature, said polyvinyl butyral having a hydroxyl content of from 10% to 13% calculated as polyvinyl alcohol.

BURT CARLTON PRATT.

REFERENCES CITED

The following references are of record in the file of this patent:

UNITED STATES PATENTS

| Number | Name | Date |
|---|---|---|
| 2,120,934 | Groff | June 14, 1938 |
| 2,148,062 | Esselen | Feb. 21, 1939 |
| 2,184,288 | Dangelmajer | Dec. 26, 1939 |
| 2,339,056 | Craver | Jan. 11, 1944 |
| 2,308,530 | McManus | Jan. 19, 1943 |
| 2,358,836 | Swan | Sept. 26, 1944 |
| 2,371,085 | Powers | Mar. 6, 1945 |
| 2,272,828 | Berg | Feb. 10, 1942 |

FOREIGN PATENTS

| Number | Country | Date |
|---|---|---|
| 405,986 | Great Britain | Feb. 12, 1934 |
| 416,412 | Great Britain | Sept. 10, 1934 |